US005637391A

United States Patent [19]

Claflin et al.

[11] Patent Number: 5,637,391

[45] Date of Patent: Jun. 10, 1997

[54] POWDER COATED CHARGE ROLLER

[75] Inventors: Curt J. Claflin; John Y. Kim, both of Lexington, Ky.; George P. Marshall, Boulder, Colo.; Ronald L. Roe; Donald W. Stafford, both of Lexington, Ky.

[73] Assignee: Lexmark International, Inc., Lexington, Ky.

[21] Appl. No.: 541,661

[22] Filed: Oct. 10, 1995

[51] Int. Cl.$^{6}$ .......... B32B 5/16

[52] U.S. Cl. .......... 428/323; 428/327; 430/126; 492/46; 399/176

[58] Field of Search .......... 428/323, 327; 430/126; 492/46; 355/219

[56] References Cited

U.S. PATENT DOCUMENTS 5,112,708 5/1992 Okunuki et al. .......... 430/31
5,164,780 11/1992 Ohno et al. .......... 355/251
5,418,605 5/1995 Arahira et al. .......... 355/219
5,506,745 4/1996 Litman .......... 361/225
5,534,981 7/1996 Ohno et al. .......... 355/245

*Primary Examiner*—Mark Chapman
*Attorney, Agent, or Firm*—John A. Brady

[57] ABSTRACT

Rubber charge roller cores are coated with styrene acrylic powder. Excess powder is removed, and the rollers are used in normal operation without the usual permanent outer layer. The more complex and costly outer layer of nylon is eliminated. Dust resulting from normal operation replaces the original powder coating.

24 Claims, No Drawings

POWDER COATED CHARGE ROLLER

TECHNICAL FIELD

This invention relates to the imaging field of electrophotography, and, more specifically, relates to an improved roller for contact charging, commonly termed charge rollers.

BACKGROUND OF THE INVENTION

Charge rollers minimize the creation of ozone since they contact the surface being charged. Charge rollers normally have an outer layer different from the body of the roller to concentrate charge at the outer layer, to protect the body from deterioration during use, and, if necessary, to prevent chemical interaction between the body of the charge roller and the photosensitive surface being charged.

A typical coating of such existing charge rollers is nylon, application of which is a costly step which employs solvents which must be contained so as not to enter the environment.

This invention employs an economical layer of power on the outer surface of the body of a charge roller. This is applied by simply contacting the roller with ample amount of the powder and cleaning away the excess, all at much less cost than normal dip coating or the like. It is known in the prior art to coat cleaner blades and, occasionally, to coat charge rollers with a lubricant, such as corn starch powder.

DISCLOSURE OF THE INVENTION

Charge rollers of resilient organic material such as hydrin rubber or urethane rubber filled with ionic conductors are immersed in styrene acrylic copolymer powder and stirred or rolled until fully coated. (Only the longitudinal dimension need be coated as that is the surface which contacts a photoconductor to effect charging.) The rollers are then buffed and then blown with air to remove excess powder. The powder layer may be coalesced by heat for subsequent ease in handling and cleaning.

These charge rollers function indefinitely with respect to the powder layer because paper dust and general environmental dust forms on the charge roller during normal operation. This coating provides the function of the original powder applied at manufacture.

BEST MODE FOR CARRYING OUT THE INVENTION

The charge roller prior to powder coating is the prior charge roller core before it is coated with a continuous outer layer. That is cylindrical, normally with a steel shaft for support and electrical conductivity, and with a central body of naturally conductive hydrin rubber or a central body of conductive ion-containing urethane rubber. Conductivity of the body may be moderately conductive or semiconductive depending on the intended application. This is termed the charge roller core. As is conventional, the longitudinal outer layer surface forms a nip with a photoconductive surface to effect charging.

In accordance with this invention each charge roller core is rolled in an excess supply of the powder. The power is Acrybase (trademark) 1406 excess supply of the powder. The power is Acrybase (trademark) 1406 powder, generally used as a component of electrophotographic dry toners, which is a styrene acrylic copolymer powder material with a median particle size of 8 to 8.5 microns, with 10% less than 5 microns and 2% to 4% greater than 16 microns and substantially no material greater than 20 microns. Such material sizes tend to reduce large particles such as those greater than 50 microns, which cause print defects and are therefore contaminants. The excess powder is buffed and then air blown, which removes excess powder.

This powder replaces the nylon coating previously used. One function of the powder coating is to provide a protective layer that inhibits contaminants from adhering to the surface. The powder coating serves a second function as a barrier layer that prevents the urethane or hydrin core from degrading the photoconductor drum surface. The third function of the powder coating is to form an electrically resistive layer between the charge roller core and the photoconductor surface that prevents excessive charge and high background in toned images. Other powder coatings studied (approximately thirty) did not perform all three functions adequately.

The powder may be fused after application by bringing the coated rollers to 100 degrees C for 15 minutes, which form an interconnected film (particles fused with spaces between the particles) which fulfills the three functions stated in the foregoing paragraph. This is only an alternative. The additional benefit of this fused film coating is its ability to be handled and cleaned prior and during assembly in a printer or copier.

Accordingly, this invention is a replacement for the more complex and costly nylon coating, prevents contaminants from adhering to the charge roller core surface, prevents the degradation of the organic photoconductor drum surface by the urethane or hydrin core, possesses the appropriate electrical properties that allow correct level of charge on the photoconductor surface and prevents high background in toned images. Operating of the charge roller during use is not limited by any loss of the original coating since paper dust and other dust coat the charge roller during operation in a electrophotographic printer or copier and provide the foregoing function.

Alternatives of implementation will be apparent and can be anticipated.

What is claimed is:

1. A charge roller comprising a moderately electrically conductive or semiconductive cylindrical core having a body of resilient organic material, the outer longitudinal surface of said core being coated with styrene acrylic copolymer applied as a powder and then buffed to remove excess powder.

2. The charge roller as in claim 1 in which said organic material is urethane rubber or hydrin rubber.

3. The charge roller as in claim 2 in which said powder is applied as powder having median particle size of less than 9 microns.

4. The charge roller as in claim 3 in which said powder coat has been melted into a coalesced film by heat.

5. The charge roller as in claim 3 in which said powder is applied as a powder having a median particle size of about 8 to 8.5 microns, with, about 10 percent less than 5 microns and about 2 percent to 4 percent greater than 16 microns and substantially all material less than about 20 microns.

6. The charge roller as in claim 5 in which said powder coat has been melted into a coalesced film by heat.

7. The charge roller as in claim 2 in which said organic material is hydrin rubber.

8. The charge roller as in claim 7 in which said powder coat has been melted into a coalesced film by heat.

9. The charge roller as in claim 7 in which said powder is applied as a powder having a median particle size of less than 9 microns.

10. The charge roller as in claim 9 in which said powder coat has been melted into a coalesced film by heat.

11. The charge roller as in claim 2 in which said powder coat has been melted into a coalesced film by heat.

12. The charge roller as in claim 2 in which said organic material is urethane rubber.

13. The charge roller as in claim 12 in which said powder coat has been melted into a coalesced film by heat.

14. The charge roller as in claim 12 in which said powder is applied as powder having median particle size of less than 9 microns.

15. The charge roller as in claim 14 in which said powder is applied as powder having a median particle size of about 8 to 8.5 microns, with about 10 percent less than 5 microns and about 2 percent to 4 percent greater than 16 microns and substantially all material less than about 20 microns.

16. The charge roller as In claim 15 in which said powder coat has been melted into a coalesced film by heat.

17. The charge roller as in claim 14 in which said powder is applied as powder having a median particle size of about 8 to 8.5 microns, with about 10 percent less than 5 microns and about 2 percent to 4 percent greater than 16 microns and substantially all material less than about 20 microns.

18. The charge roller as in claim 17 in which said powder coat has been melted into a coalesced film by heat.

19. The charge roller as in claim 14 in which said powder coat has been melted into a coalesced film by heat.

20. The charge roller as in claim 1 in which said powder is applied as powder having median particle size of less than 9 microns.

21. The charge roller as in claim 20 in which said powder is applied as powder having a median particle size of about 8 to 8.5 microns, with about 10 percent less than 5 microns and about 2 percent to 4 percent greater than 16 microns and substantially all material less than about 20 microns.

22. The charge roller as in claim 21 in which said powder coat has been melted into a coalesced film by heat.

23. The charge roller as in claim 20 in which said powder coat has been melted into a coalesced film by heat.

24. The charge roller as in claim 1 in which said powder coat has been melted into a coalesced film by heat.

* * * * *